United States Patent [19]
Russo

[11] Patent Number: 5,738,547
[45] Date of Patent: Apr. 14, 1998

[54] TOY CONVERSION STRUCTURE

[76] Inventor: Ernest Russo, P.O. Box 137, Stow, N.Y. 14785

[21] Appl. No.: 718,213

[22] Filed: Sep. 20, 1996

[51] Int. Cl.$^6$ .................................................. H01R 13/66
[52] U.S. Cl. ..................... 439/620; 439/894; 446/175; 446/176
[58] Field of Search .................. 439/620, 894, 439/668; 446/175, 176, 456, 197

[56] References Cited

U.S. PATENT DOCUMENTS

| | | | |
|---|---|---|---|
| 3,818,293 | 6/1974 | Wood | 318/139 |
| 4,310,788 | 1/1982 | Hanyu et al. | 318/551 |
| 4,399,393 | 8/1983 | Santini | 318/313 |
| 5,305,244 | 4/1994 | Newman et al. | 364/708.1 |

OTHER PUBLICATIONS

"Teaching Individuals with Physical and Multiple Disabilities", June I. Bigge, Chas. B. Merrill Publ. Co., 1982, pp. 102–107.

"Homemade Battery–Powered Toys and Educational Devices for Severely Handicapped Children", Linda J. Burkhart, publ. L. Burkhart, Copyright 1985.

"Using Computers and Speech Synthesis to Facilitate Interaction with Young and/or Severely Handicapped Children", Linda J. Burkhart, publ. L. Burkhart, Copyright 1994.

*Primary Examiner*—Gary F. Paumen
*Attorney, Agent, or Firm*—James J. Ralabate

[57] ABSTRACT

This is a unit or structure that can be used to easily convert a foot pedal operated toy vehicle to other than foot operation. This is to provide children who do not have the use of their legs the ability to still enjoy playing with this type toy. The unit has relatively low cost components that are readily accessible and easy to install.

3 Claims, 5 Drawing Sheets

TOY CONVERSION STRUCTURE

This invention relates to a structure to assist handicapped children and, more specifically, a unit that can be used to convert foot operated power riding toys to other than foot operated.

BACKGROUND OF THE INVENTION

It is somewhat disconcerting to witness children who are handicapped watch other more fortunate children playing with or on toys that are understandably designed only for normal children. Included in such toys are battery powered riding vehicles such as cars, trucks, fire engines and the like. Most of these riding vehicles are foot operated using a foot pedal to activate and run the vehicles. Since the market is generally not large enough for manufacturers to make other than foot operated toy vehicles, the next best solution is to provide conversion structures that can convert these toys for use by handicapped children. Since such conversion structures will be mainly used by parents, usually unskilled mechanically, it is important that any conversion structure offered be relatively economical and easy to use.

There are known various kits or structures that can be used to alter the motors or operation of toy or other vehicles such as those that control the speed of such motors. Some of these are disclosed in U.S. Pat. Nos. 3,818,293; 4,310,788 and 4,399,393. The disclosure of U.S. Pat. No. 3,818,293 (Wood) relates to a mechanical switching device to vary the speed of the vehicle. Hanyu, U.S. Pat. No. 4,310,788 is concerned with the use of a device to control the speed of an alternating current motor in contrast to the DC motor used in Wood. U.S. Pat. No. 4,399,393 to Santini discloses an accelerator control for field-controlled DC motors using a photodetector detecting light reflecting from a movable vane connected to the control input. None of these references are concerned with the problem being solved by the present invention.

SUMMARY OF THE INVENTION

It is therefore an object of this invention to provide a conversion structure different from the above-noted references.

Another object is to provide a conversion unit or structure that can be used to convert a battery operated toy vehicle from foot operation to other than foot operation and activation.

Still a further object of this invention is to provide a conversion structure that is easy to install and convenient to use.

Yet a further object of this invention is to provide a conversion structure that is particularly suited for hand operation of a battery powered toy vehicle.

Another still further object of this invention is to provide a conversion structure that can be sold as a kit or as a final product.

A yet further object of this invention is to provide a conversion unit that is easily subsequently disengaged to return the vehicle to its original operation.

Still a further object of this invention is to provide a unit converter that would replace the existing foot operation with a simpler hand operated mechanism.

A further object is to provide a conversion unit that is relatively simple in construction and which provides for handicapped occupants the ability to control the toy vehicle.

These and other objects are accomplished according to this invention by a conversion unit or structure that comprises a rectangular (or other) housing. This conversion unit is used to convert a battery operated toy vehicle from foot operation to other than foot operation. While, for purposes of clarity, the converted activation means will be referred to as "hand" operation, it is intended that any activation means other than foot activation be included. The housing has a removable top lid that can be reattached after all of the components are placed in the housing. The housing contains an electrical relay such as a Radio Shack relay 12 volt DC, plug-in solar connection, Catalog No. 275-218C; Radio Shack is a trademark of Tandy Corp. Any other suitable relay may be used if desired. The housing used may also be obtained from Radio Shack, a housing found to be suitable was Radio Shack Experimental Box 3, Catalog No. 270-231. In the housing are drilled two holes, one hole at the bottom of the housing or box and the second hole on an end wall of the box. Through one of the holes (preferably the one located at the bottom of the box) a Radio Shack or other 2-conductor open circuit phone jack, catalog No. 274-252B is installed. This phone jack can be replaced with any other suitable hand operated electrical connection means if desired. However, phone jacks are highly preferred since common phone jacks such as those available from Radio Shack are the standard used by suppliers of items for the handicapped. This jack is used because of availability, safety and because it is interchangeable for use with other items for the disabled. By "conventional" phone jack is meant those jacks sold on the market similar to the disclosed Radio Shack phone jack. Through the second hole (preferably the one located in a side wall of the box), a plurality of wires which are connected to components inside the box are fitted. These wires extend from inside the box to at least 10 inches outside the box so they can be easily connected to components of the toy vehicle. Another separate wire internal of the box electrically connects the phone jack to the electrical relay. The phone jack is used to connect to an adapted switch which turns the motor on and off and maintains the hand operation of the vehicle. The plurality of wires (usually three) are connected at one end to either or both the relay and the phone jack and the other ends are spliced into the circuitry of the vehicle in a way that short circuits the foot pedal electrical connections and replaces the foot pedal as the operative or activation means of the vehicle. The relay is used in the structure of this invention to complete the circuit when installed in the vehicle. The phone jack is used as above noted as the electrical outlet connection to the adapted switch or button that can be used to operate the vehicle in lieu of the foot pedal. Once the relay, the phone jack and the wires are all connected within the housing or box and the wires extend through an aperture in the box, a top lid with Velcro brand tape on the outside is placed over an open top portion of the box and secured thereto. Now the conversion unit or structure is ready to be installed in a battery operated toy vehicle.

In most foot operated toy vehicles, the power to drive the vehicle comes from two 6 volt batteries that produce 12 volts. These batteries are usually located under the hood of the vehicle. The power goes from the batteries to the foot pedal which acts like a switch. When a child pushes down on the foot pedal, it turns on the switch that sends the power from the batteries to the foot pedal and then through the existing control system and to the motor(s) that power the vehicle.

When the conversion unit of this invention is attached via the Velcro or any other connection means to the vehicle, the operation and activation of the vehicle is changed from foot pedal operation to hand operation. As earlier noted, when "hand operation" is used throughout this disclosure it is intended that any activation means other than foot activation be included.

The conversion unit or structure of this invention replaces the foot pedal. Instead of the power from the batteries going directly to the foot pedal, the power goes through the control relay (in the box) and through the open circuit jack (or phone jack attached to the box). The circuit is closed when an adapted switch or other "on-off" means is plugged into the phone jack. When a child presses the adapted switch, the circuit is closed and the power goes from the batteries through the conversion box or conversion structure of this invention. The foot pedal is held closed by a screw or other convenient means. The power then goes through the existing control system of the vehicle to the motor(s) that power the vehicle. Installation of the conversion kit or structure of this invention will be described in detail in the disclosure relating to the drawings. The vehicle can easily be converted back to a foot operated vehicle by merely disengaging (and not removing) the conversion unit of this invention. While the conversion unit of this invention is used with a 12 volt (2 six volt) batteries, the conversion unit and its components can be modified for use with any other voltage system. The term "hand activated or operated" will be used. However, this is intended to cover any other activation means such as voice activation, puff activation, eye movement activation, brain activation or the like. All of these are known activation means capable of use by disabled persons.

DETAILED DESCRIPTION OF THE DRAWINGS AND PREFERRED EMBODIMENTS

Figure 1:
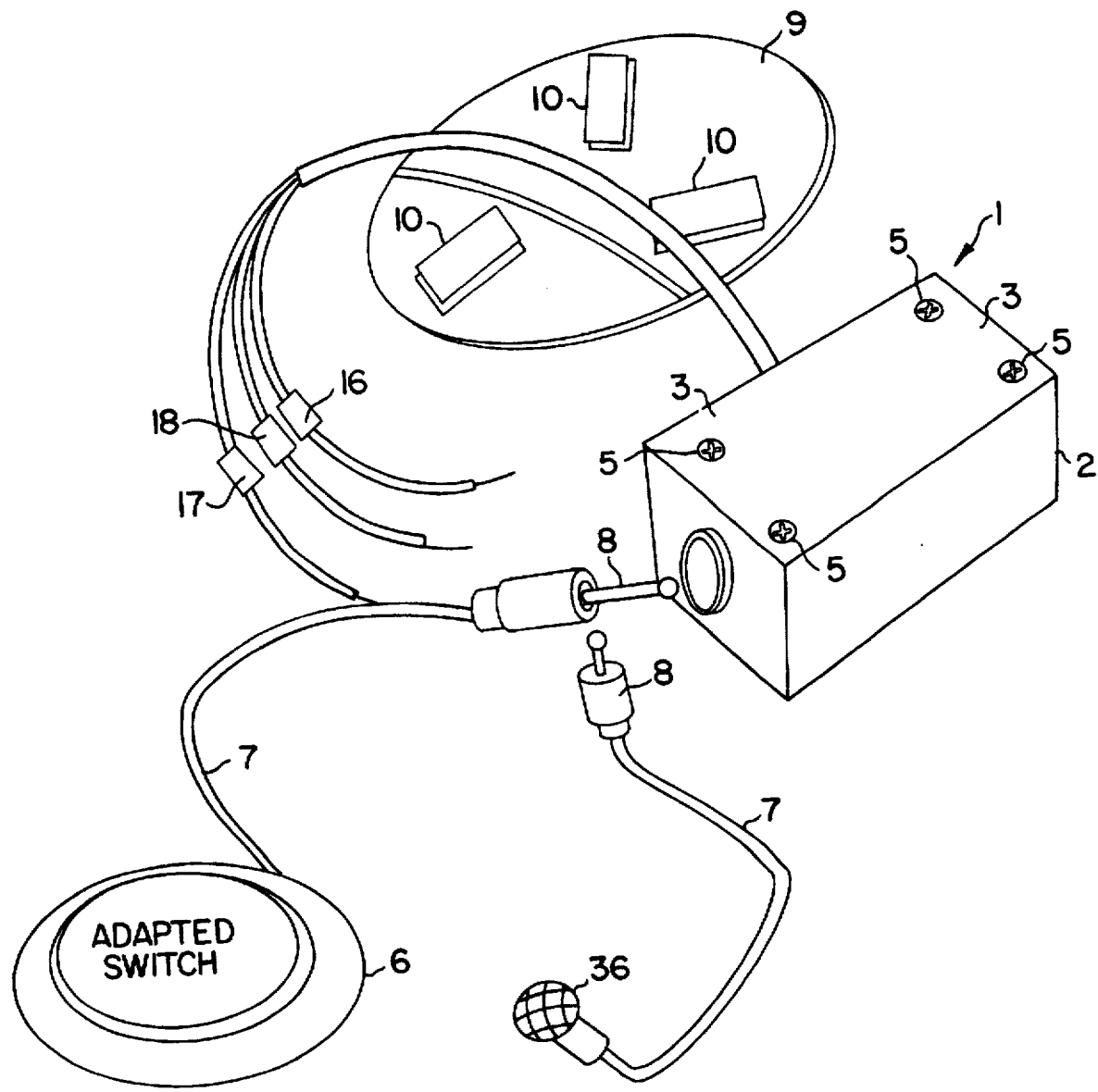
FIG. 1 is a side perspective view of the assembled conversion structure of this invention with the optional parts adapted switch and steering wheel attachment.
Figure 2:
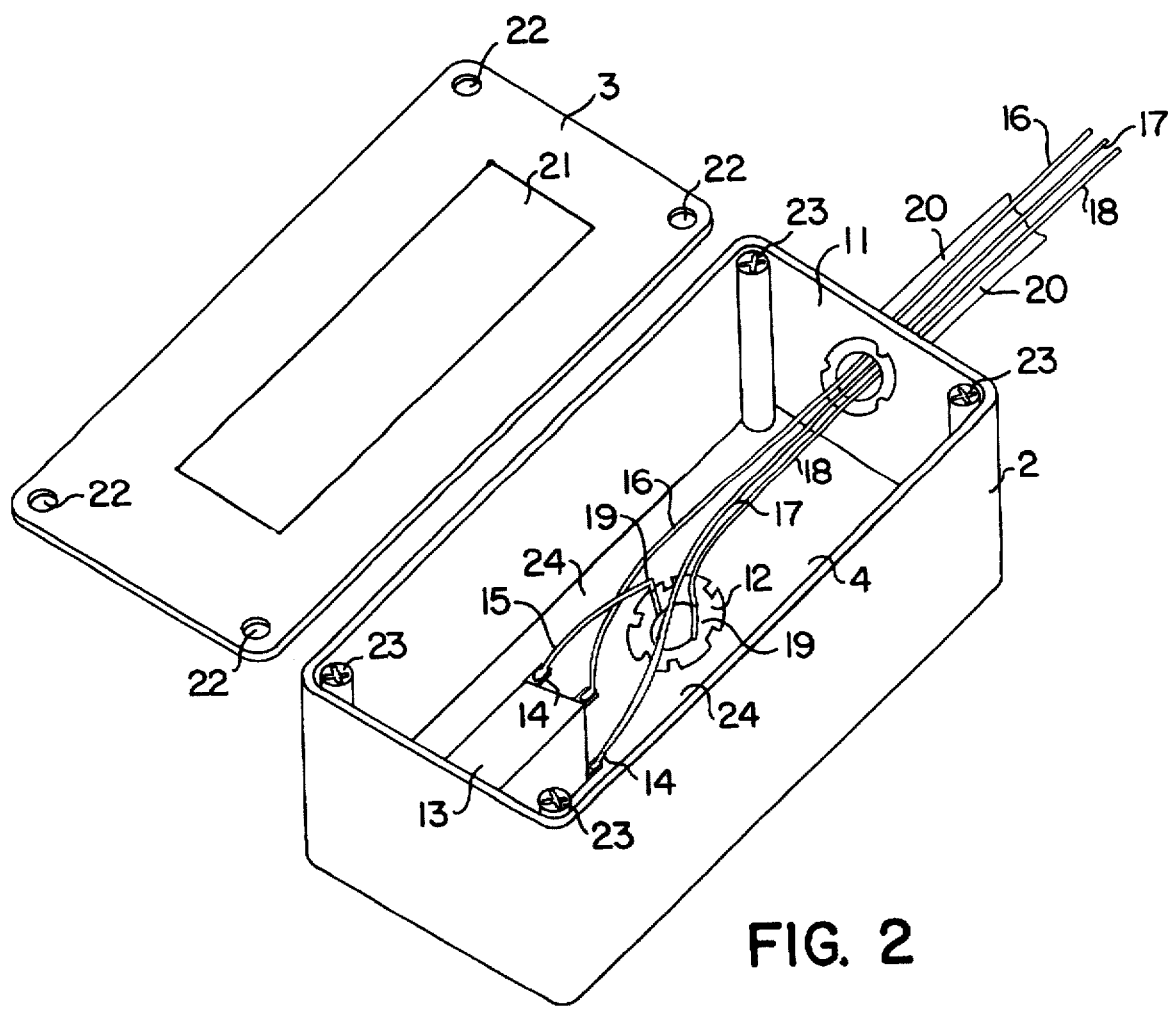
FIG. 2 is a side perspective view of the conversion structure of this invention with the housing open 1 to illustrate internal components.
Figure 3:
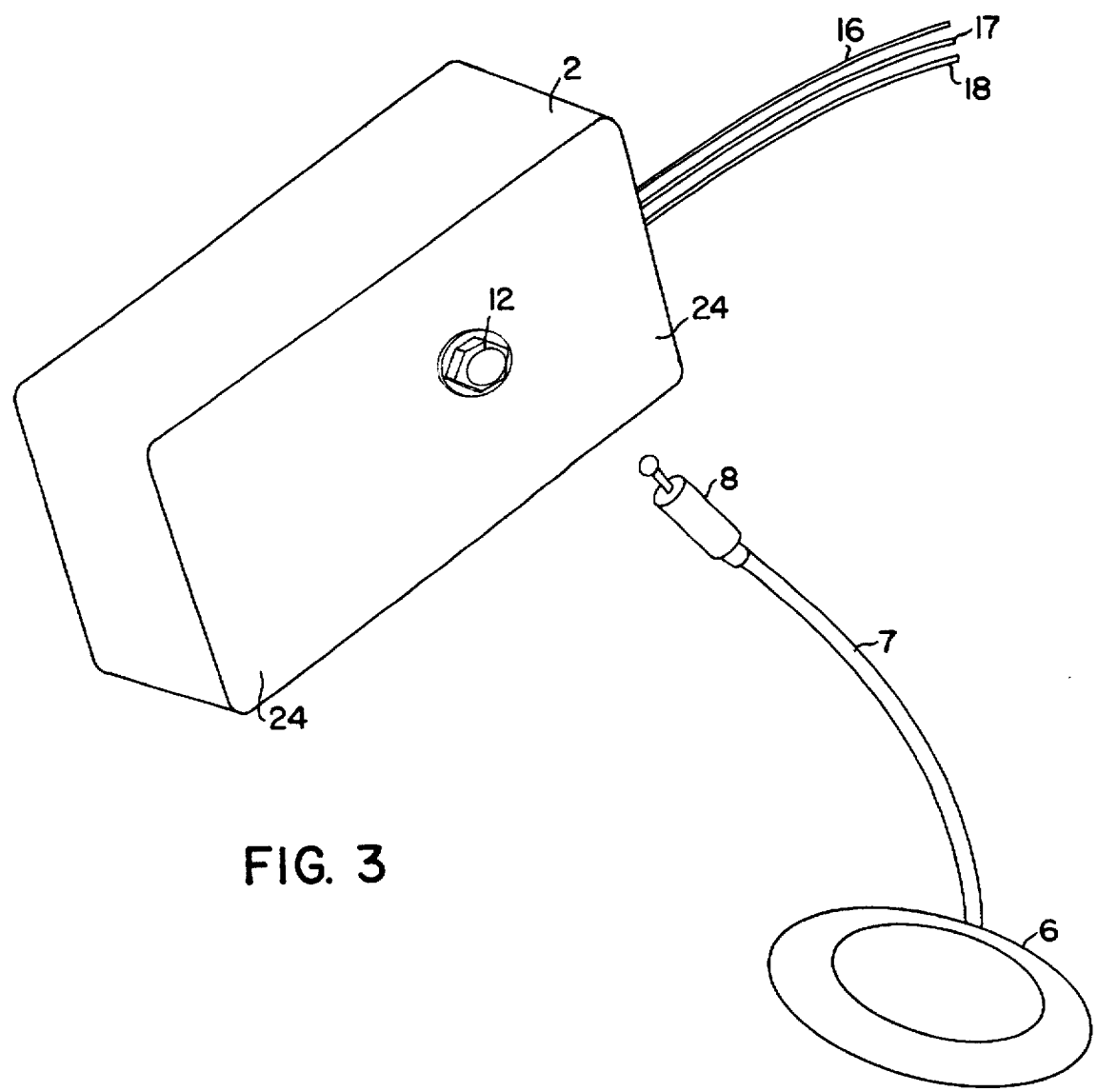
FIG. 3 is a bottom perspective view of an embodiment of the conversion structure of this invention with the phone jack connection at the bottom rather than side as shown in FIG. 1.

In FIGS. 1 and 2, the conversion structure 1 of this invention comprises a protective box-like (or other form) housing 2. The housing 2 has a removable lid 3 that is connected to a previously open face 4 of the protective housing 2. Protective housing 2 has a compartment which houses unit components. Screws 5 or other securing means are used to attach lid 3 to housing 2. An optional adapted switch 6 which can be hand operated is connected to an activation cable 7 for connection to housing 2 via jack plug 8. Also shown in FIG. 1 is a voice activation means 36 of the type described in U.S. Pat. No. 5,305,244 that can be used in lieu of hand activation switch 6. An optional steering wheel base plate 9 may be used to mount an activation means or adapted switch 6 thereto. The optional base plate 9 has Velcro strips 10 for attachment to a steering wheel. Velcro is a trademark of Velcro U.S. Inc. of 406 Brown Ave., Manchester, N.H. In FIG. 2 lid 3 is shown removed from housing 2 exposing the open face 4 and open compartment 11 within housing 2. In protective housing 2 and compartment 11 is located a connected phone jack 12 which extends from the interior of compartment 11 through the entire thickness of housing bottom 24 so that its opening is accessible from the aperture formed thereby and opening into the atmosphere. An electrical relay 13 is attached to the inner surface of housing bottom 24. Relay electrical connectors 14 are attached to wires, wire 15 connecting relay 13 to phone jack 12. Wire 16 extends from relay 13 to outside housing 2 as does wire 17. A fourth wire 18 is connected to phone jack 12 and also extends out of housing 2. Phone jack electrical connectors 19 are thus connected to wires 15 and 18. The wires 16, 17 and 18 are covered by an insulated wire covering 20 on portions of those wires external of housing 2. On the outer face of lid 3 is a Velcro strip 21 which is used to connect structure 1 to any portion of the toy vehicle. Lid 3 has apertures 22 therein through which a screw or other securing means will fit to attach lid 3 to housing 2 using housing openings 23. Phone jack 12 may be located on any portion of housing 2, however, it is preferred that phone jack 12 be located at the bottom 24 of housing 2 as shown in FIG. 3.

Figure 4:
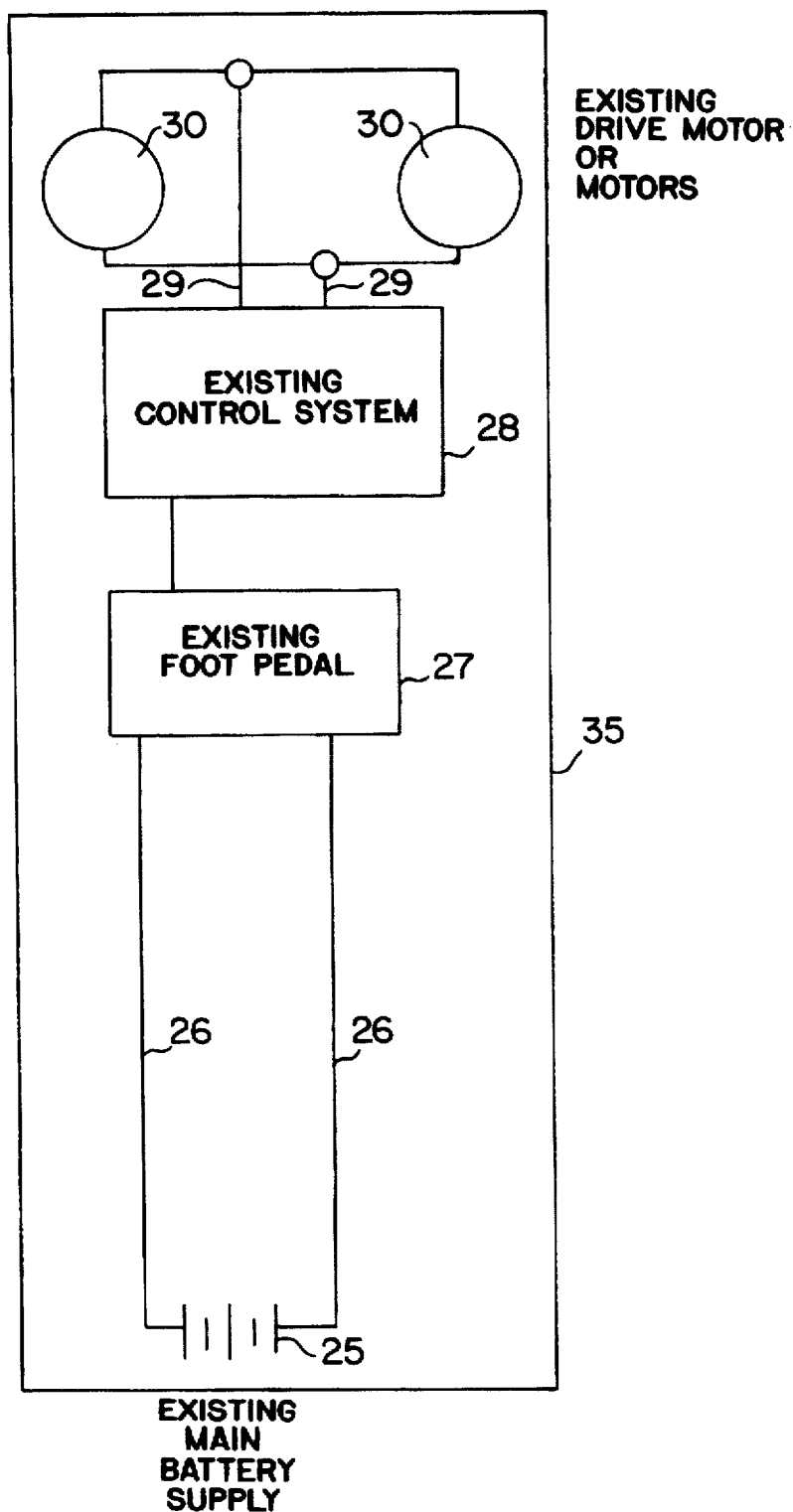
FIG. 4 is a circuit diagram showing the electrical system of a conventional battery-powered toy vehicle without the use of the conversion structure of this invention.

In FIG. 4 a circuit diagram of the circuitry used in a conventional battery powered vehicle 35 is illustrated. The electric power to run the vehicle is supplied by a battery or batteries 25. As earlier noted, the conversion structure 1 of this invention is designed for 12 volts (usually two 6 volt batteries) however the components of conversion structure 1 may be modified to suit any size battery. The batteries 25 send power through wires 26 to the foot pedal 27. The foot pedal 27 basically acts like a switch. When a child pushes down on the foot pedal, it turns on a switch that sends the power from the batteries 25 through the foot pedal 27 and then through the existing control system 28 through the wires 29 and to the motor or motors 30 that power the vehicle.

Figure 5:
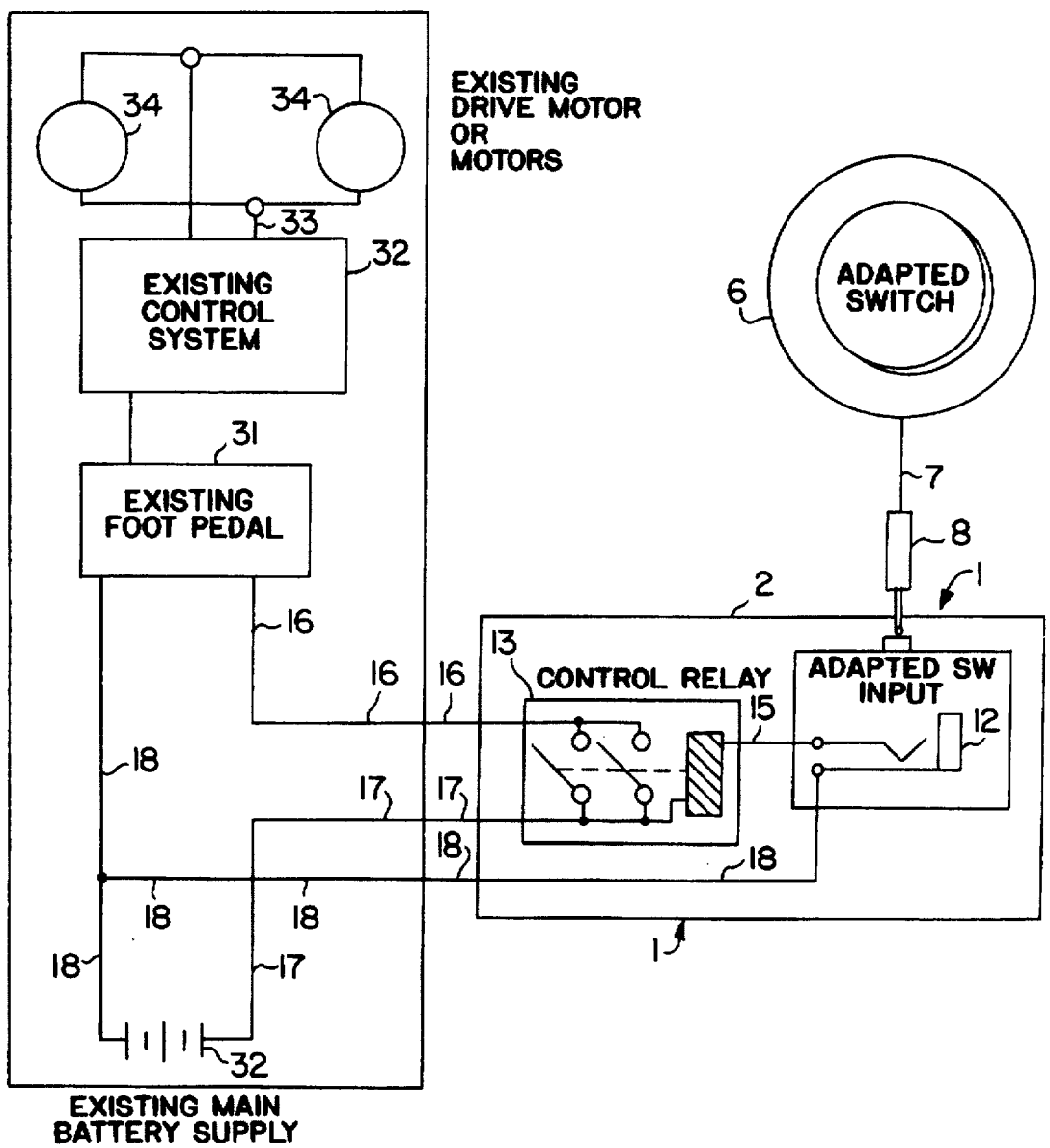
FIG. 5 is a circuit diagram showing the electrical system of a battery powered toy vehicle with the conversion structure of this invention installed.

In FIG. 5 the conversion structure 1 of this invention is shown when installed into the circuit of FIG. 4 or FIG. 5 illustrates the circuit diagram of the circuitry used when the vehicle is equipped with structure 1. The conversion structure 1 of this invention comprises a control electrical relay 13, a phone jack 12 and outlet wires 16, 17 and 18. Those wires extend out of from the relay 13 and phone jack 12. Wires 16 and 17 extend from relay 13 out of housing 2 and are connected into the vehicle circuit as shown with like marked lines in FIG. 5. Wire 18 is connected on one end to phone jack 12, out of housing 2 and connected into the vehicle circuit as shown by the elements marked 18. The adapted switch 6 can be an activation means other than the foot pedal of the vehicle. Activation means that can be used in addition to hand activation are puff switch activation or many other activation means such as those disclosed in the following:

"Teaching Individuals with Physical and Multiple Disabilities" by June L Bigge, Charles E. Merrill Publishing Company, 1982, pages 102–107;

"Homemade Battery-Powered Toys and Educational Devices for Severely Handicapped Children" by Linda J. Burkhart, published by L. Burkhart, Copyright 1985;

"Using Computers and Speech Synthesis to Facilitate Interaction with Young and/or Severely Handicapped Children" by Linda J. Burkhart, published by L. Burkhart, Copyright 1987;

"Engineering the Preschool Environment for Interactive Symbolic Communication" by Carol Goosens, Sharon Sapp Crain and Pamela S. Elder, Southeast Augmentative Communication Conference Publications, 2430 11th Avenue North, Birmingham, Ala. 35234, Copyright 1994;

"Selection and Use of Simple Technology in Home, School, Work and Community Settings" by Jackie Levin and Lynn Scherfenberg, Ablenet, Inc., 1081 Tenth Ave., SE., Minneapolis, Minn. 55414, Copyright 1990;

Zygo Industries, 1995-96 Catalog, Box 1008, Portland, Oreg. 97207;

Prentke Romich Company, 1995-96 Catalog, RD2, Box 191, Shreve, Ohio 44676; and

Ablenet, Inc., 1995-96 Catalog, Tenth Ave., SE., Minneapolis, Minn. 55414.

Also, Radio Shack 1996 Catalog illustrates pressure switches and remote control switches.

In addition, a child could put a mouth stick in his/her mouth and use it to hit a switch on the steering wheel or mounted elsewhere (mouth sticks are not switches per se but a way to activate them), as referenced and illustrated in June L. Bigge's book, "Teaching Individuals with Physical and Multiple Disabilities", Charles E. Merrill Publishing Company, 1982, pages 99 and 222. Alternatively, a stick can be mounted on a child's head (using a strap) and it can be used to activate a switch as in Bigge's book on pages 235 and 237.

These activation means of the above references are all included in the activation means usable in the present invention. Voice activation means may also be used such as those referred to in U.S. Pat. No. 5,305,244, eye-tracking activation means using a system described in the publication "A New Look", OEM Magazine, May 1995 Issue and brain-actuated activation means (EEG) such as the system described in "Science Times", New York Times, Mar. 7, 1995. All of these activation means and the noted citations are incorporated into this disclosure by reference. Any activation means (to start and run a vehicle) other than foot activation means is intended to be included in this invention. The conversion structure 1 of this invention as illustrated in FIG. 5 replaces the foot pedal 31. Instead of the electric power from the batteries 32 going directly to the foot pedal 31, the power goes to the control relay 13 and through the open circuit phone jack 12. The circuit is closed when the adapted switch (activation means) 6 is plugged into phone jack 12. When the user presses the adapted switch 6 (in hand activation), the circuit is closed and the power goes from the batteries 32 through the conversion structure 1, then through the foot pedal 31. The foot pedal 31 is held closed by a screw or other securing means. The power then goes through the existing control system 32 and through the wires 33 that go from the existing control system to the motors 34 that power the vehicle.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A conversion structure having means to convert a battery powered vehicle from a foot pedal operated vehicle to a hand operated vehicle, said structure comprising a protective housing, an electrical relay means and a conventional phone jack, said phone jack attached to said housing and extending completely through a wall of said housing, said electrical relay means contained in said housing and electrically connected to said phone jack, said housing having a plurality of electrical wires extending therefrom, at least two of said electrical wires attached on one end to said relay means and unattached on their opposite end, at least another one of said electrical wires attached on one end to said phone jack and unattached on an opposite end, all of said electrical wires extending from within said housing through an opening in a wall of said housing, said housing having on an outside surface thereof means to removably attach said conversion structure to said battery powered vehicle and wherein said phone jack is adapted to connect to an activation means.

2. The conversion structure of claim 1 wherein said housing has a removable lid, said removable lid having on an outside surface attachment means.

3. The conversion structure of claim 1 wherein said activation means: hand activation, puff switch activation, voice activation, eye activation and brain activation.

* * * * *